(12) United States Patent
Hou et al.

(10) Patent No.: US 11,006,179 B2
(45) Date of Patent: May 11, 2021

(54) METHOD AND APPARATUS FOR OUTPUTTING INFORMATION

(71) Applicant: Baidu Online Network Technology (Beijing) Co., Ltd., Beijing (CN)

(72) Inventors: Zaipeng Hou, Beijing (CN); Shuhan Luan, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/297,230

(22) Filed: Mar. 8, 2019

(65) Prior Publication Data
US 2019/0379941 A1  Dec. 12, 2019

(30) Foreign Application Priority Data

Jun. 8, 2018 (CN) .......................... 201810587827.5

(51) Int. Cl.
| | |
|---|---|
| *H04N 21/472* | (2011.01) |
| *H04N 21/2387* | (2011.01) |
| *H04N 21/475* | (2011.01) |
| *G10L 15/26* | (2006.01) |
| *G10L 17/00* | (2013.01) |
| *H04N 21/422* | (2011.01) |

(52) U.S. Cl.
CPC ....... *H04N 21/47202* (2013.01); *G10L 15/26* (2013.01); *G10L 17/00* (2013.01); *H04N 21/2387* (2013.01); *H04N 21/42203* (2013.01); *H04N 21/4753* (2013.01); *H04N 21/47217* (2013.01)

(58) Field of Classification Search
None
See application file for complete search history.

(56) References Cited

U.S. PATENT DOCUMENTS

| | | | | |
|---|---|---|---|---|
| 6,144,938 A | * | 11/2000 | Surace ................. | G10L 13/033 704/257 |
| 8,036,361 B2 | * | 10/2011 | Batni .................. | H04Q 3/0029 379/210.01 |
| 8,374,874 B2 | * | 2/2013 | Cross, Jr. .............. | G10L 15/22 704/270 |

(Continued)

FOREIGN PATENT DOCUMENTS

| | | |
|---|---|---|
| CN | 105959806 A | 9/2016 |
| CN | 107507612 A | 12/2017 |

(Continued)

*Primary Examiner* — An Son P Huynh
(74) *Attorney, Agent, or Firm* — Nixon Peabody LLP (57) ABSTRACT

A method and an apparatus for outputting information are provided. A specific embodiment of the method comprises: in response to receiving voice inputted by a user, generating a voiceprint characteristic vector based on the voice; inputting the voiceprint characteristic vector into a voiceprint recognition model to obtain identity information of the user; selecting, from a preset multimedia file set, a predetermined number of multimedia files matching the obtained identity information of the user as target multimedia files; and generating, according to the target multimedia files, preview information, and outputting the preview information. This embodiment realizes the multimedia preview information recommendation with pertinence.

14 Claims, 6 Drawing Sheets

(56) References Cited

U.S. PATENT DOCUMENTS

| | | | | |
|---|---|---|---|---|
| 8,874,448 B1* | 10/2014 | Kauffmann | H04M 1/6016 | 704/278 |
| 9,988,055 B1* | 6/2018 | O'Flaherty | G08B 21/06 | |
| 10,339,925 B1* | 7/2019 | Rastrow | H04L 67/306 | |
| 10,587,921 B2* | 3/2020 | Cho | H04N 21/44213 | |
| 2002/0073417 A1* | 6/2002 | Kondo | H04N 21/439 | 725/10 |
| 2005/0016366 A1* | 1/2005 | Ito | G10H 1/28 | 84/716 |
| 2005/0289582 A1* | 12/2005 | Tavares | H04H 60/33 | 725/10 |
| 2006/0229505 A1* | 10/2006 | Mundt | A61B 5/16 | 600/300 |
| 2006/0287912 A1* | 12/2006 | Raghuvamshi | G06Q 30/02 | 705/14.4 |
| 2007/0153089 A1* | 7/2007 | Cooper | G06K 9/00335 | 348/194 |
| 2008/0260212 A1* | 10/2008 | Moskal | G06K 9/00315 | 382/118 |
| 2009/0133051 A1* | 5/2009 | Hildreth | H04N 21/4223 | 725/28 |
| 2009/0138805 A1* | 5/2009 | Hildreth | H04N 21/64322 | 715/745 |
| 2010/0153885 A1* | 6/2010 | Yates | H04N 5/44543 | 715/841 |
| 2010/0161409 A1* | 6/2010 | Ryu | G06Q 30/0254 | 705/14.43 |
| 2011/0069940 A1* | 3/2011 | Shimy | H04N 21/42201 | 386/296 |
| 2011/0157299 A1* | 6/2011 | Lee | H04N 7/15 | 348/14.08 |
| 2012/0084450 A1* | 4/2012 | Nagamati | G06F 21/31 | 709/229 |
| 2012/0240045 A1* | 9/2012 | Bradley | G10L 13/04 | 715/716 |
| 2013/0067513 A1* | 3/2013 | Takami | H04N 21/454 | 725/34 |
| 2013/0091515 A1* | 4/2013 | Sakata | H04N 21/4223 | 725/10 |
| 2013/0173765 A1* | 7/2013 | Korbecki | H04N 21/42209 | 709/221 |
| 2013/0194177 A1* | 8/2013 | Sakata | G06F 3/01 | 345/156 |
| 2013/0205314 A1* | 8/2013 | Ramaswamy | H04N 21/44218 | 725/14 |
| 2013/0241925 A1* | 9/2013 | Konami | G06F 3/013 | 345/419 |
| 2013/0298146 A1* | 11/2013 | Conrad | H04N 21/44213 | 725/12 |
| 2014/0067828 A1* | 3/2014 | Archibong | G06F 3/0481 | 707/748 |
| 2014/0150002 A1* | 5/2014 | Hough | H04N 21/2668 | 725/9 |
| 2014/0168056 A1* | 6/2014 | Swaminathan | G06F 3/147 | 345/156 |
| 2014/0195918 A1* | 7/2014 | Friedlander | G06F 3/0485 | 715/727 |
| 2014/0210714 A1* | 7/2014 | Kang | H04N 21/47 | 345/158 |
| 2015/0110471 A1* | 4/2015 | Zheng | G06F 3/0304 | 386/291 |
| 2015/0127336 A1* | 5/2015 | Lei | G10L 17/18 | 704/232 |
| 2015/0244747 A1* | 8/2015 | Wickenkamp | G06F 3/0482 | 726/28 |
| 2015/0294670 A1* | 10/2015 | Roblek | G10L 17/005 | 704/232 |
| 2016/0021412 A1* | 1/2016 | Zito, Jr. | H04N 21/488 | 725/13 |
| 2016/0057497 A1* | 2/2016 | Kim | H04N 21/42203 | 725/10 |
| 2016/0293167 A1* | 10/2016 | Chen | H04N 21/23476 | |
| 2017/0006322 A1* | 1/2017 | Dury | A63F 13/49 | |
| 2017/0091850 A1* | 3/2017 | Alvarez | H04W 4/30 | |
| 2017/0099455 A1* | 4/2017 | Mazzarella | H04N 7/147 | |
| 2017/0164049 A1 | 6/2017 | Wang | | |
| 2017/0228804 A1* | 8/2017 | Soni | G06Q 30/0641 | |
| 2017/0243387 A1* | 8/2017 | Li | G06K 9/00281 | |
| 2018/0018964 A1* | 1/2018 | Reilly | G10L 15/02 | |
| 2018/0041536 A1* | 2/2018 | Berlin | G06N 3/08 | |
| 2018/0075763 A1* | 3/2018 | Wainfan | A61B 5/4803 | |
| 2018/0144742 A1* | 5/2018 | Ye | G10L 15/02 | |
| 2018/0181802 A1* | 6/2018 | Chen | G06N 3/0454 | |
| 2018/0189647 A1* | 7/2018 | Calvo | G06N 5/022 | |
| 2018/0225083 A1* | 8/2018 | Barkley | G06F 3/04883 | |
| 2018/0260415 A1* | 9/2018 | Gordo Soldevila | G06K 9/3233 | |
| 2018/0365695 A1* | 12/2018 | Liu | G06K 9/00885 | |
| 2018/0373547 A1* | 12/2018 | Dawes | G06F 16/90332 | |
| 2019/0014386 A1* | 1/2019 | Maher | H04N 21/23418 | |
| 2019/0034483 A1* | 1/2019 | Millius | G06F 16/337 | |
| 2019/0075359 A1* | 3/2019 | Boss | H04L 67/306 | |
| 2019/0096400 A1* | 3/2019 | Xie | G10L 15/22 | |
| 2019/0108423 A1* | 4/2019 | Jones | G06K 9/00288 | |
| 2019/0182072 A1* | 6/2019 | Roe | G06F 3/167 | |
| 2019/0251707 A1* | 8/2019 | Gupta | G06N 3/0454 | |
| 2019/0278895 A1* | 9/2019 | Streit | G06F 21/602 | |

FOREIGN PATENT DOCUMENTS

| | | |
|---|---|---|
| CN | 107623614 A | 1/2018 |
| CN | 107659849 A | 2/2018 |
| JP | 2005157894 A | 6/2005 |
| JP | 2012003423 A | 1/2012 |
| JP | 2016018229 A | 2/2016 |
| JP | 2017161825 A | 9/2017 |

* cited by examiner

METHOD AND APPARATUS FOR OUTPUTTING INFORMATION

CROSS-REFERENCE TO RELATED APPLICATIONS

This application claims priority to Chinese Patent Application No. 201810587827.5, filed on Jun. 8, 2018, titled "Method and Apparatus for Outputting Information," which is hereby incorporated by reference in its entirety.

TECHNICAL FIELD

The present disclosure relates to the field of smart television technology, and specifically to a method and apparatus for outputting information.

BACKGROUND

Smart televisions have been widespread in our lives. The smart televisions are not only limited to traditional television program viewing functions. At present, the popular television application market provide thousands of television applications for users, covering television live streaming, video-on-demand, stock and finance, healthy life, system optimization tool, etc.

In the existing technology, the television, as a household device shared by family members, generally provides the same service for every family member.

SUMMARY

Embodiments of the present disclosure provide a method and apparatus for outputting information.

In a first aspect, the embodiments of the present disclosure provide a method for outputting information. The method includes: in response to receiving voice inputted by a user, generating a voiceprint characteristic vector based on the voice; inputting the voiceprint characteristic vector into a voiceprint recognition model to obtain identity information of the user; selecting, from a preset multimedia file set, a predetermined number of multimedia file matching the obtained identity information of the user as a target multimedia file; and generating, according to the target multimedia files, preview information, and outputting the preview information.

In some embodiments, the generating a voiceprint characteristic vector based on the voice includes: importing the voice into a pre-trained universal background model to perform mapping to obtain a voiceprint characteristic super-vector, the universal background model being used to represent a corresponding relationship between the voice and the voiceprint characteristic super-vector; and performing a dimension reduction on the voiceprint characteristic super-vector to obtain the voiceprint characteristic vector.

In some embodiments, the method further includes: accumulating, for a multimedia file in at least one multimedia file involved by an operation instruction for a multimedia file retrieval, a number of retrievals for the multimedia file as a retrieval number corresponding to the multimedia file. The selecting, from a preset multimedia file set, a predetermined number of multimedia file matching the obtained identity information of the user as a target multimedia file includes: selecting, from the preset multimedia file set, the predetermined number of multimedia files matching the obtained identity information of the user based on a descending order of the retrieval numbers as the target multimedia files.

In some embodiments, the method further includes: accumulating, for a multimedia file in at least one multimedia file involved by an operation instruction for a multimedia file playback, a number of playbacks for the multimedia file as a playback number corresponding to the multimedia file. The selecting, from a preset multimedia file set, a predetermined number of multimedia file matching the obtained identity information of the user as a target multimedia file includes: selecting, from the preset multimedia file set, the predetermined number of multimedia file matching the obtained identity information of the user based on a descending order of the playback numbers as the target multimedia file.

In some embodiments, the identity information of the user includes at least one of: gender, age or family member identifier.

In some embodiments, the method further includes: selecting, from a preset timbre information set, timbre information matching the identity information of the user; and outputting voice interaction information using a timbre indicated by the selected timbre information, to perform a voice interaction with the user.

In some embodiments, the voiceprint recognition model is a pre-trained model for representing a corresponding relationship between the voiceprint characteristic vector and the identity information of the user.

In a second aspect, the embodiments of the present disclosure provide an apparatus for outputting information. The apparatus includes: a generating unit, configured to generate, in response to receiving voice inputted by a user, a voiceprint characteristic vector based on the voice; a recognizing unit, configured to input the voiceprint characteristic vector into a voiceprint recognition model to obtain identity information of the user, the voiceprint recognition model being used to represent a corresponding relationship between the voiceprint characteristic vector and the identity information of the user; an option unit, configured to select, from a preset multimedia file set, a predetermined number of multimedia file matching the obtained identity information of the user as a target multimedia file; and an outputting unit, configured to generate, according to the target multimedia file, preview information and output the preview information.

In some embodiments, the generating unit is further configured to: import the voice into a pre-trained universal background model to perform mapping to obtain a voiceprint characteristic super-vector, the universal background model being used to represent a corresponding relationship between the voice and the voiceprint characteristic super-vector; and perform a dimension reduction on the voiceprint characteristic super-vector to obtain the voiceprint characteristic vector.

In some embodiments, the apparatus further includes an execution unit. The execution unit is configured to: perform, in response to determining the voice including an operation instruction, the operation instruction, the operation instruction including at least one of: a channel selection, a volume control, an image parameter adjustment, a multimedia file retrieval, or a multimedia file playback.

In some embodiments, the apparatus further includes a retrieval number counting unit, configured to accumulate, for a multimedia file in at least one multimedia file involved by the operation instruction for the multimedia file retrieval, a number of retrievals for the multimedia file as a retrieval number corresponding to the multimedia file. Selecting, from the preset multimedia file set, the predetermined number of multimedia files matching the obtained identity information of the user as the target multimedia files includes: selecting, from the preset multimedia file set, the predetermined number of multimedia file matching the obtained identity information of the user based on a descending order of the retrieval numbers as the target multimedia file.

In some embodiments, the apparatus further includes a playback number counting unit, configured to: accumulate, for a multimedia file in at least one multimedia file involved by the operation instruction for the multimedia file playback, a number of playbacks for the multimedia file as a playback number corresponding to the multimedia file. The selecting, from the preset multimedia file set, the predetermined number of multimedia files matching the obtained identity information of the user as the target multimedia files includes: selecting, from the preset multimedia file set, the predetermined number of multimedia file matching the obtained identity information of the user based on a descending order of the playback numbers as the target multimedia file.

In some embodiments, the identity information of the user includes at least one of: gender, age or family member identifier.

In some embodiments, the apparatus further includes a timbre adjusting unit, configured to: select, from a preset timbre information set, timbre information matching the identity information of the user; and output voice interaction information using a timbre indicated by the selected timbre information, to perform a voice interaction with the user.

In some embodiments, the voiceprint recognition model is a pre-trained model for representing the corresponding relationship between the voiceprint characteristic vector and the identity information of the user.

In a third aspect, the embodiments of the present disclosure provide an electronic device. The electronic device includes: one or more processors; and a storage device, configured to store one or more programs. The one or more programs, when executed by the one or more processors, cause the one or more processors to implement the method described in any implementation in the first aspect.

In a fourth aspect, the embodiments of the present disclosure provide a computer readable medium storing a computer program. The computer program, when executed by a processor, implements the method described in any implementation in the first aspect.

According to the method and apparatus for outputting information provided by the embodiments of the present disclosure, the user identity information is recognized by the voice, and a to-be-recommended multimedia file is then selected according to the user identity information to generate the preview information. Thus, the multimedia preview information recommendation with pertinence is realized.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
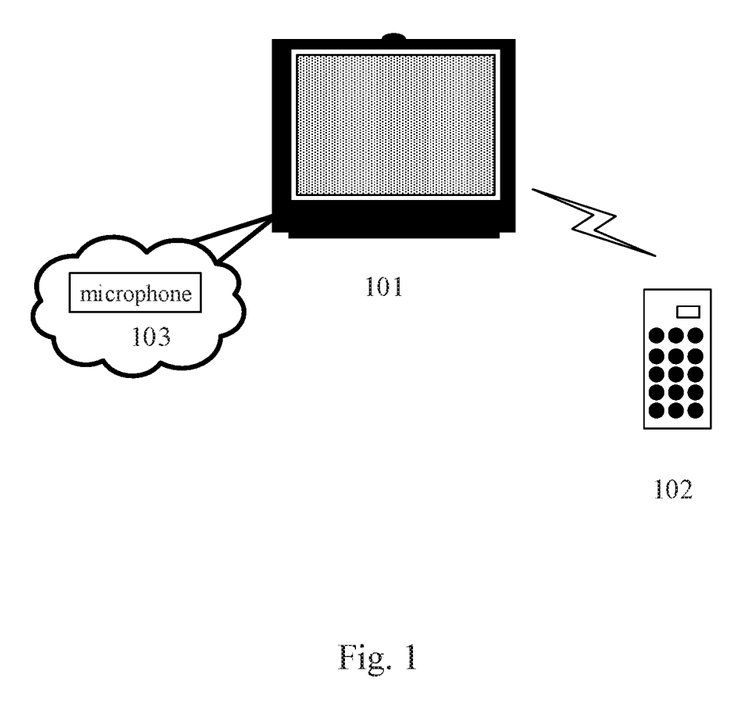
FIG. 1 is a diagram of an exemplary system architecture in which an embodiment of the present disclosure may be applied.

FIG. 1 shows an exemplary system architecture 100 in which a method for outputting information or an apparatus for outputting information according to the present disclosure may be applied.

As shown in FIG. 1, the system architecture 100 may include a smart television 101 and a remote control 102. The smart television 101 is provided with a microphone 103 configured to collect sound of a viewer. The remote control 102 is configured to remotely control the smart television 101. Thus, functions such as a conversion for a channel of a smart television and an output of information may be realized. After connecting to a network, the smart television 101 can provide various entertainment, information and learning resources such as a web browser, a full high definition 3D somatic game, a video call and an online education. In addition, the smart television 101 may be extended infinitely, and can respectively support tens of thousands of pieces of utility functional software developed independently and shared together by organizations and individuals, and professional and amateur software lovers. Thus, the smart television may realize various application services such as a network search, a network television, video-on-demand, a digital music, online news, and a network video call. A user may use the smart television to search for a television channel and a website, record a television program, and play a satellite program, a cable television program and an online video.

Like a smart phone, the smart television 101 has a fully open platform and is equipped with an operating system, on which the user may install and uninstall a program provided by a third party service provider such as software or a game. Through such program, the user may continuously extend the functions of a color television, and surf the Internet through a network cable or a wireless network. The smart television 101 may collect the sound of the viewer through the microphone 103, recognize the identity of the viewer, and then provides a personalized service for a different identity.

It should be noted that the method for outputting information provided in the embodiments of the present disclosure is generally performed by the smart television 101.

Correspondingly, the apparatus for outputting information is generally provided in the smart television 101.

Figure 2:
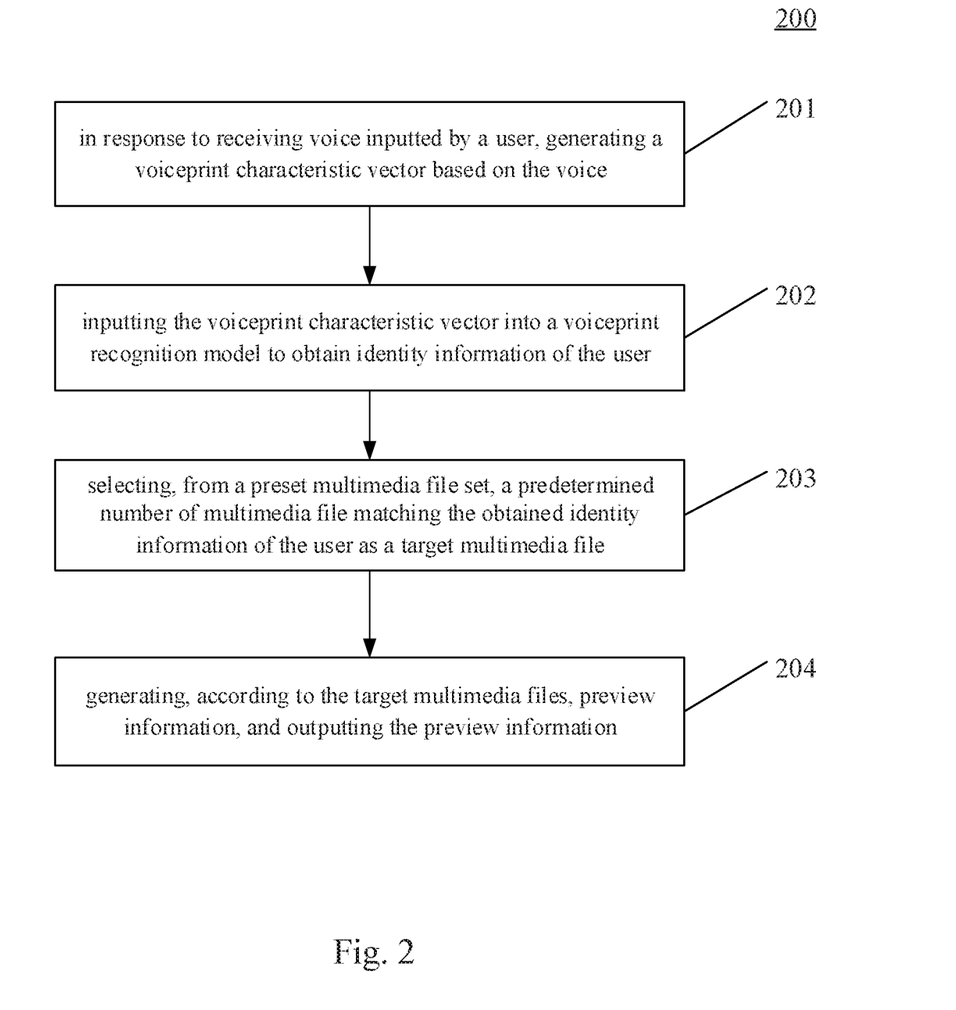
FIG. 2 is a flowchart of an embodiment of a method for outputting information according to the present disclosure.

Further referring to FIG. 2, FIG. 2 illustrates a flow 200 of an embodiment of a method for outputting information according to the present disclosure. The method for outputting information includes the following steps 201 to 204.

Step 201 includes in response to receiving voice inputted by a user, generating a voiceprint characteristic vector based on the voice.

In this embodiment, an execution subject (e.g., the smart television shown in FIG. 1) of the method for outputting information may receive the voice verbally inputted by the user through a microphone. The voice may include a remote control instruction (e.g., "turning on"). In addition, the voice may be voice that does not include a remote control instruction. A voiceprint is an acoustic wave spectrum carrying verbal information and displayed by an electro-acoustic instrument. Modern scientific research suggests that the voiceprint not only has a specificity, but also has a relatively stable characteristic. The voiceprint characteristic vector may be a vector identifying a characteristic of the acoustic wave spectrum of the user. If there are the sounds of a plurality of people in a piece of audio, a plurality of voiceprint characteristic vectors may be extracted. It should be noted that generating the voiceprint characteristic vector based on the voice is a publicly known technique widely studied and applied at present, which will not be repeatedly described herein.

As an example, the generating the voiceprint characteristic vector based on the voice may be implemented by extracting a typical feature in the voice. Specifically, features of the sound such as a wavelength, a frequency, an intensity, and a rhythm can reflect the characteristics of the sound of the user. Therefore, when the voiceprint characteristic extraction is performed on the voice, the features in the sound such as the wavelength, the frequency, the intensity, and the rhythm may be extracted, and the feature values of the features such as the wavelength, the frequency, the intensity, and the rhythm in the voice may be determined. The feature values of the features such as the wavelength, the frequency, the intensity, and the rhythm in the voice are used as elements in the voiceprint characteristic vector.

As an example, the generating the voiceprint characteristic vector based on the voice may also be implemented by extracting an acoustic feature in the voice, for example, a Mel-frequency cepstral coefficient. The Mel-frequency cepstral coefficient is used as an element in the voiceprint characteristic vector. The process of extracting the Mel-frequency cepstral coefficient from the voice may include a pre-emphasis, framing, windowing, a fast Fourier transform, Mel filtering, a logarithmic transformation, and a discrete cosine transform.

Before inputting the voice, the user may make the smart television muted through the remote control, to keep the collected voice inputted by the user from including the sound of a television program. Alternatively, the smart television may be muted by a predetermined voice command. For example, the user may verbally input "silent" to make the smart television muted.

In some alternative implementations of this embodiment, an electronic device may import the voice into a pre-trained universal background model (UBM) to perform mapping to obtain a voiceprint characteristic super-vector (i.e., a Gaussian super-vector). The universal background model is also referred to as a global background model for representing a general background characteristic. The universal background model is obtained by performing training on voices of a large number of impostors using an EM (Expectation-Maximum) algorithm. The voice for training for the UBM model is from a large number of different speakers. Assuming that there are a plurality of Gaussian distributions in the trained universal background model, if a plurality of frames of voice characteristic sequences of a certain speaker are extracted, the voiceprint characteristic super-vector of the speaker may be calculated. In fact, the difference between the acoustic characteristic of the speaker and the universal background model is reflected. That is, the unique individuality in the pronunciation of the speaker is reflected. Thus, the voice of the user having an uncertain length may be finally mapped onto a voiceprint characteristic super-vector having a fixed length that can reflect the vocalization characteristic of the user.

Such high-dimensional voiceprint characteristic super-vector not only includes an individual difference in pronunciation, but may also include a difference caused by a channel. Therefore, a dimension reduction is also required to be performed on the super-vector through some supervised dimension reduction algorithms, to map the super-vector onto a lower-dimensional vector. The dimension reduction may be performed on the voiceprint characteristic super-vector through a Joint Factor Analysis (JFA) method to obtain the voiceprint characteristic vector. The Joint Factor Analysis method is an effective algorithm for channel compensation in voiceprint authentication algorithms, which estimates a channel factor by assuming that a speaker space and a channel space are independent, and may be described by two low-dimensional factor spaces respectively. The dimension reduction may alternatively be performed on the voiceprint characteristic super-vector through a probabilistic linear discriminant analysis (PLDA) algorithm to obtain the voiceprint characteristic vector. The probabilistic linear discriminant analysis algorithm is also a channel compensation algorithm, which is a linear discriminant analysis (LDA) algorithm in a probabilistic form. In addition, the dimension reduction may alternatively be performed on the voiceprint characteristic super-vector through an identifying vector (I-Vector) to obtain the voiceprint characteristic vector. In fact, in order to ensure the accuracy of the voiceprint, a plurality of pieces of voice generally need to be provided when the universal background model is trained. Then, a plurality of voiceprint characteristic vectors of the above voice are extracted and obtained. Next, the voiceprint characteristic vector of the user may be stored, and voiceprint characteristic vectors of a plurality of users constitute a voiceprint library.

Then, the dimension reduction is performed on the voiceprint characteristic super-vector to obtain the voiceprint characteristic vector using the above method. By using a large number of acoustic characteristic vectors from many people, a Gaussian mixture model may be trained through the Expectation Maximization algorithm. This model describes a probability distribution of voice characterization data of many people, which may be understood as the commonality of all the speakers. The model is served as a priori model for a voiceprint model of a certain speaker. Therefore, the Gaussian mixture model is also referred to as the UBM model. The universal background model may also be constructed through a deep neural network.

Alternatively, before the voiceprint characteristic vector is generated, the voice may be processed to filter out a noise. For example, the noise in the voice is filtered out through a singular value decomposition algorithm or a filter algorithm. The noise herein may include a discordant sound having a confusing change in pitch and intensity. The noise herein may also include a sound that interferes with the recognition for a target sound, for example, background music. The singular value decomposition (SVD) is an important matrix factorization in Linear algebra, which is the generalization of the unitary diagonalization of a normal matrix in matrix analysis. It has important applications in the fields of signal processing and statistics. The SVD-based de-noising technique is one of the subspace algorithms. Simply put, a noisy signal vector space is decomposed into two subspaces respectively dominated by a pure signal and a noise signal. Then, the pure signal is estimated by simply removing the noisy signal vector component falling in the "noise space." The noise in an audio file may also be filtered out through an adaptive filter method and a Kalman filter method. The voice is usually framed with an interval of 20-50 ms, and then, each frame of voice may be mapped to an acoustic characteristic sequence having a fixed length by some feature extraction algorithms (mainly performing a conversion from a time domain to a frequency domain).

Step 202 includes inputting the voiceprint characteristic vector into a voiceprint recognition model to obtain identity information of the user.

In this embodiment, the voiceprint recognition model may be a commercially available model for recognizing the identity of the user. The voiceprint recognition model may alternatively be a pre-trained model for representing a corresponding relationship between the voiceprint characteristic vector and the identity information of the user. The identity information of the user may include at least one of: gender, age or family member identifier. The age may be a certain age range, for example, 4-8 years old, and 20-30 years old. Gender and age may be combined to determine the specific identity of the user. For example, child, elderly, adult female, and adult males may be recognized. The family member identifier is used to identify a pre-registered family member, for example, mother, father, daughter, and grandmother. If the number of members having close ages and the same gender in the family is merely one, the family member may be directly determined using the age and the gender of the user. For example, the family members include a mother, a father, a daughter and a grandmother, it is determined that the female aged between 50 and 60 is the grandmother, and the female aged between 4 and 8 is the daughter. The voiceprint recognition model may include a classifier, which can map a voiceprint characteristic vector in the voiceprint characteristic vector library to a certain one of given categories of the user, and thus, the voiceprint recognition model may be applied into the prediction for the category of the user. The classification may be performed by the age, by the gender, or by a combination of the age and the gender, for example, girl, male adult, and female elderly. That is, the category of the user may be outputted by inputting the voiceprint characteristic vector into the classifier. The classifier used in this embodiment may include a decision tree, a logistic regression, a naive Bayes, a neural network, etc. Based on a simple probability model, the classifier uses the largest probability value to perform a classification prediction on the data. The classifier is trained in advance. The classifier may be trained by extracting a voiceprint characteristic vector from a large number of sound samples. In general, the configuration and the implementation for the classifier may include: 1) selecting samples (including a positive sample and a negative sample), all the samples being divided into a training sample and a test sample; 2) performing a classifier algorithm based on the training sample, to generate the classifier; 3) inputting the test sample into the classifier to generate a prediction result; and 4) calculating a necessary evaluation index according to the prediction result, to evaluate a performance of the classifier.

For example, sounds of a large number of children are collected as the positive sample, and sounds of a large number of adults are collected as the negative sample. Based on the positive sample and the negative sample, the classifier algorithm is performed to generate the classifier. Then, the positive sample and the negative sample are respectively inputted into the classifier, to generate the prediction result to verify whether the result is child. The performance of the classifier is evaluated according to the prediction result.

The voiceprint recognition model may further include a family member mapping table. The family member mapping table records a corresponding relationship between the family member identifier, the gender, and the age. The family member identifier may be determined by retrieving the classification result of the classifier from the family member mapping table. For example, if the result outputted by the classifier is a female aged between 50 and 60, the family member identifier of this user is determined as the grandmother through the family member mapping table.

Alternatively, the voiceprint recognition model may be the voiceprint library. The voiceprint library is used to represent a corresponding relationship between the voiceprint characteristic vector and the identity information. The voiceprint characteristic vector is inputted into a predetermined voiceprint library to perform matching, and a first predetermined number of pieces of identity information are selected in descending order of matching degrees and outputted. By collecting the sound of a given user a plurality of times, the voiceprint characteristic vector of the user may be constructed through step 201, and then, the corresponding relationship between the voiceprint characteristic vector and the identity information is established. The voiceprint library is constructed by registering corresponding relationships between the voiceprint characteristic vectors of a plurality of users and the identity information of the users. When the matching degree between the above voiceprint characteristic vector and the above voiceprint library is calculated, the calculation may be performed using a Manhattan distance, Minkowski distance, or a cosine similarity.

Step 203 includes selecting, from a preset multimedia file set, a predetermined number of multimedia files matching the obtained identity information of the user as target multimedia files.

In this embodiment, the multimedia files in the preset multimedia file set are rated in advance, for example, only available for people above 18 years old to view. For example, a multimedia file of an animation type matches the child. A horror movie matches the adult. A target multimedia file is a multimedia file to be recommended to the user. When the identity information refers to the child, a plurality of multimedia files suitable for the child to view such as an animation, a nursery rhyme and a science and education program may be selected from the multimedia file set as the target multimedia files.

Step 204 includes generating, according to the target multimedia files, preview information and outputting the preview information.

In this embodiment, the preview information for the predetermined number of target multimedia files selected in step 203 may be randomly generated. The preview information may also be generated based on a descending order of a number of requests, to output the preview information. The number of the requests is counted each time when the multimedia file is requested. The preview information may include a video screenshot, a duration, a profile, a file identifier, etc. According to the file identifier, the user may select the multimedia file to be played through the remote control. The multimedia file to be played may also be selected by inputting the file identifier by voice.

In some alternative implementations of this embodiment, the above method may further include: performing, in response to determining the voice including an operation instruction, the operation instruction. The operation instruction may include at least one of: a channel selection, a volume control, an image parameter adjustment, a multimedia file retrieval, or a multimedia file playback. For example, the user may input the operation instruction such as "switching to central channel 5," "turning the volume up," "increasing the brightness," "searching for Tom Cruise's movies," or "playing number 1 (the multimedia file identifier in the preview information)" by voice.

In some alternative implementations of this embodiment, the above method may further include: accumulating, for a multimedia file in at least one multimedia file involved by the operation instruction for the multimedia file retrieval, a number of retrievals for the multimedia file as a retrieval number corresponding to the multimedia file. The selecting, from a preset multimedia file set, a predetermined number of multimedia files matching the obtained identity information of the user as target multimedia files includes: selecting, from the preset multimedia file set, the predetermined number of multimedia files matching the obtained identity information of the user based on a descending order of the retrieval numbers as the target multimedia files. For example, when movie A is searched 100 times, and movie B is searched 200 times, movie B may be selected to generate a preview file. Alternatively, the preview information for movie B is arranged before the preview information for movie A.

In some alternative implementations of this embodiment, the above method may further include: accumulating, for a multimedia file in at least one multimedia file involved by the operation instruction for the multimedia file playback, a number of playbacks for the multimedia file as a playback number corresponding to the multimedia file. The selecting, from a preset multimedia file set, a predetermined number of multimedia files matching the obtained identity information of the user as target multimedia files includes: selecting, from the preset multimedia file set, the predetermined number of multimedia files matching the obtained identity information of the user based on a descending order of the playback numbers as the target multimedia files. For example, when movie A is played 100 times, and movie B is played 200 times, movie B may be selected to generate a preview file. Alternatively, the preview information for movie B is arranged before the preview information for movie A.

Figure 3:
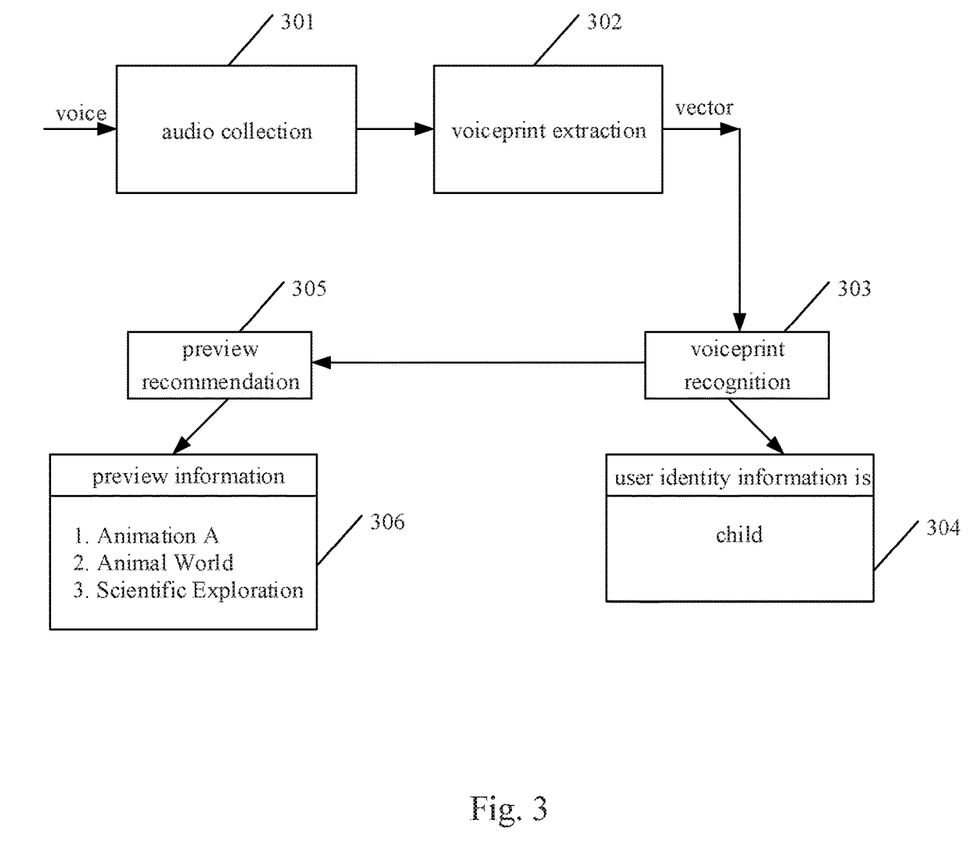
FIG. 3 is a schematic diagram of an application scenario of the method for outputting information according to the present disclosure.

Further referring to FIG. 3, FIG. 3 is a schematic diagram of an application scenario of the method for outputting information according to this embodiment. In the application scenario of FIG. 3, the smart television performs the audio collection 301 through the microphone, and receives the voice "watching TV" inputted by the child. The voiceprint extraction 302 is then performed based on the voice to generate the voiceprint characteristic vector. Next, the voiceprint characteristic vector is inputted into the pre-trained voiceprint recognition model to perform the voiceprint recognition 303, to obtain the identity information 304 (child) of the user. Then, the preview recommendation 305 is performed according to the identity information of the user, to obtain the preview information 306, including: 1) Animation A; 2) Animal World; and 3) Scientific Exploration.

In the method provided by the above embodiment of the present disclosure, the identity of the user is recognized by the voice, thereby realizing the multimedia preview information recommendation with pertinence.

Figure 4:
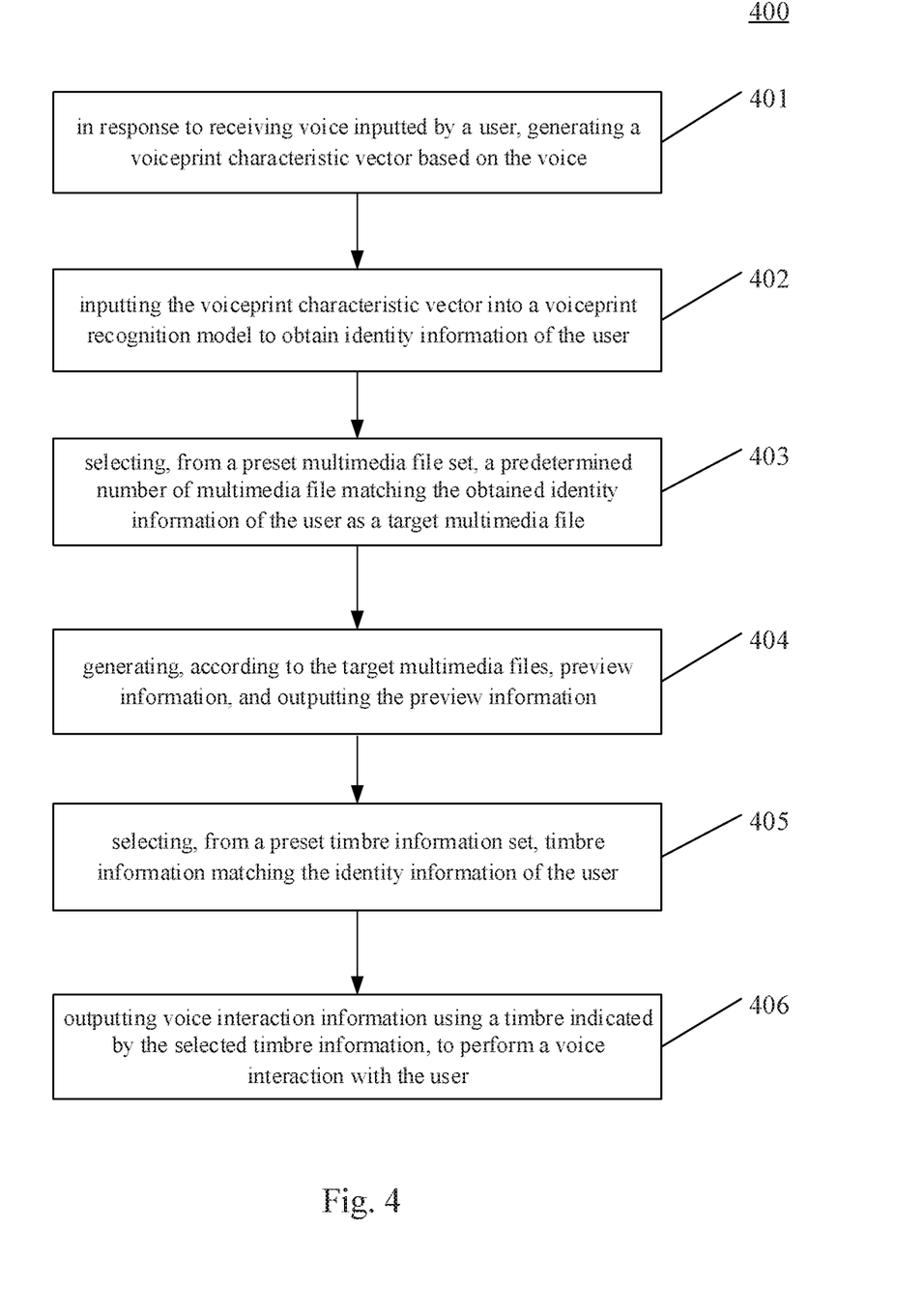
FIG. 4 is a flowchart of another embodiment of the method for outputting information according to the present disclosure.

Further referring to FIG. 4, FIG. 4 illustrates a flow 400 of another embodiment of the method for outputting information according to the present disclosure. The flow 400 of the method for outputting information includes the following steps 401 to 406.

Step 401 includes in response to receiving voice inputted by a user, generating a voiceprint characteristic vector based on the voice.

Step 402, inputting the voiceprint characteristic vector into a voiceprint recognition model to obtain identity information of the user.

Step 403, selecting, from a preset multimedia file set, a predetermined number of multimedia files matching the obtained identity information of the user as target multimedia files.

Step 404, generating, according to the target multimedia files, preview information and outputting the preview information.

Steps 401-404 are substantially the same as steps 201-204, which will not be repeatedly described.

Step 405 includes selecting, from a preset timbre information set, timbre information matching the identity information of the user.

In this embodiment, the smart television may provide various timbres for the user to select, and the selection may be performed by a voice command or by a remote control. According to the identity information of the user, the matching may be automatically performed on timbre information for the identity information. For example, for a child, the timbre of an animation character (e.g., Pleasant Goat (Xi Yang Yang), Guang Tou Qiang, or Pig Peggy) may be selected for the child. for an adult, the timbre of star A and the timbre of star B may be provided. The specific timbre may also be determined based on the playback frequency of a multimedia file. For example, when "Pleasant Goat and Big Big Wolf" is played for most times, the timbre of Pleasant Goat may be selected.

Step 406 includes outputting voice interaction information using a timbre indicated by the selected timbre information, to perform a voice interaction with the user.

In this embodiment, the voice interaction information is outputted in accordance with the timbre selected in step 405 to perform the voice interaction with the user. Thus, the interestingness may be improved. For example, the child may input "want to watch 'Pleasant Goat and Grey Wolf'" by voice. The smart television may ask him "which episode do you want to watch?" with the timbre of Pleasant Goat.

It may be seen from FIG. 4 that, as compared with the embodiment corresponding to FIG. 2, the flow 400 of the method for outputting information in this embodiment emphasizes the step of selecting the timbre. Accordingly, the solution described in this embodiment may perform the voice interaction using a different timbre for a different user group. Thus, the interestingness of the interaction between the user and the smart television is improved.

Figure 5:
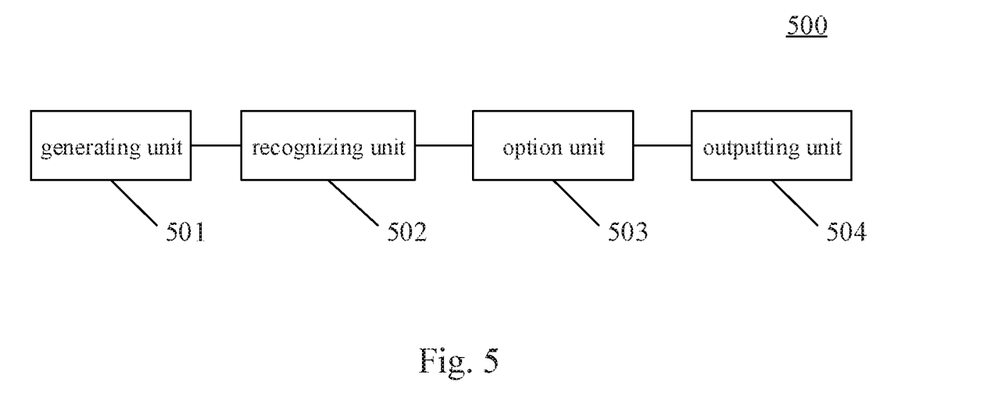
FIG. 5 is a schematic structural diagram of an embodiment of an apparatus for outputting information according to the present disclosure.

Further referring to FIG. 5, as an implementation of the method shown in the above drawings, the present disclosure provides an embodiment of an apparatus for outputting information. The embodiment of the apparatus corresponds to the embodiment of the method shown in FIG. 2, and the apparatus may be applied in various electronic devices.

As shown in FIG. 5, the apparatus 500 for outputting information in this embodiment includes: a generating unit 501, a recognizing unit 502, an option unit 503, and an outputting unit 504. The generating unit 501 is configured to generate, in response to receiving voice inputted by a user, a voiceprint characteristic vector based on the voice. The recognizing unit 502 is configured to input the voiceprint characteristic vector into a voiceprint recognition model to obtain identity information of the user. The option unit 503 is configured to select, from a preset multimedia file set, a predetermined number of multimedia files matching the obtained identity information of the user as target multimedia files. The outputting unit 504 is configured to generate, according to the target multimedia files, preview information and output the preview information.

In this embodiment, for specific processes of the generating unit 501, the recognizing unit 502, the option unit 503, and the outputting unit 504 in the apparatus 500 for outputting information, reference may be made to step 201, step 202, step 203, and step 204 in the corresponding embodiment of FIG. 2.

In some alternative implementations of this embodiment, the generating unit 501 may be further configured to: import the voice into a pre-trained universal background model to perform mapping to obtain a voiceprint characteristic super-vector, the universal background model being used to represent a corresponding relationship between the voice and the voiceprint characteristic super-vector; and perform a dimension reduction on the voiceprint characteristic super-vector to obtain the voiceprint characteristic vector.

In some alternative implementations of this embodiment, the apparatus 500 may further include an execution unit (not shown), configured to perform, in response to determining the voice including an operation instruction, the operation instruction. The operation instruction includes at least one of: a channel selection, a volume control, an image parameter adjustment, a multimedia file retrieval, or a multimedia file playback.

In some alternative implementations of this embodiment, the apparatus 500 may further include a retrieval number counting unit, configured to: accumulate, for a multimedia file in at least one multimedia file involved by the operation instruction for the multimedia file retrieval, a number of retrievals for the multimedia file as a retrieval number corresponding to the multimedia file. Selecting, from the preset multimedia file set, the predetermined number of multimedia files matching the obtained identity information of the user as the target multimedia files includes: selecting, from the preset multimedia file set, the predetermined number of multimedia files matching the obtained identity information of the user based on a descending order of the retrieval numbers as the target multimedia files.

In some alternative implementations of this embodiment, the apparatus 500 may further include a playback number counting unit, configured to: accumulate, for a multimedia file in at least one multimedia file involved by the operation instruction for the multimedia file playback, a number of playbacks for the multimedia file as a playback number corresponding to the multimedia file. The selecting, from the preset multimedia file set, the predetermined number of multimedia files matching the obtained identity information of the user as the target multimedia files includes: selecting, from the preset multimedia file set, the predetermined number of multimedia files matching the obtained identity information of the user based on a descending order of the playback numbers as the target multimedia files.

In some alternative implementations of this embodiment, the identity information of the user may include at least one of: gender, age or family member identifier.

In some alternative implementations of this embodiment, the apparatus 500 may further include a timbre adjusting unit, configured to: select, from a preset timbre information set, timbre information matching the identity information of the user; and output voice interaction information using a timbre indicated by the selected timbre information, to perform a voice interaction with the user.

In some alternative implementations of this embodiment, the voiceprint recognition model is a pre-trained model for representing a corresponding relationship between the voiceprint characteristic vector and the identity information of the user.

Figure 6:
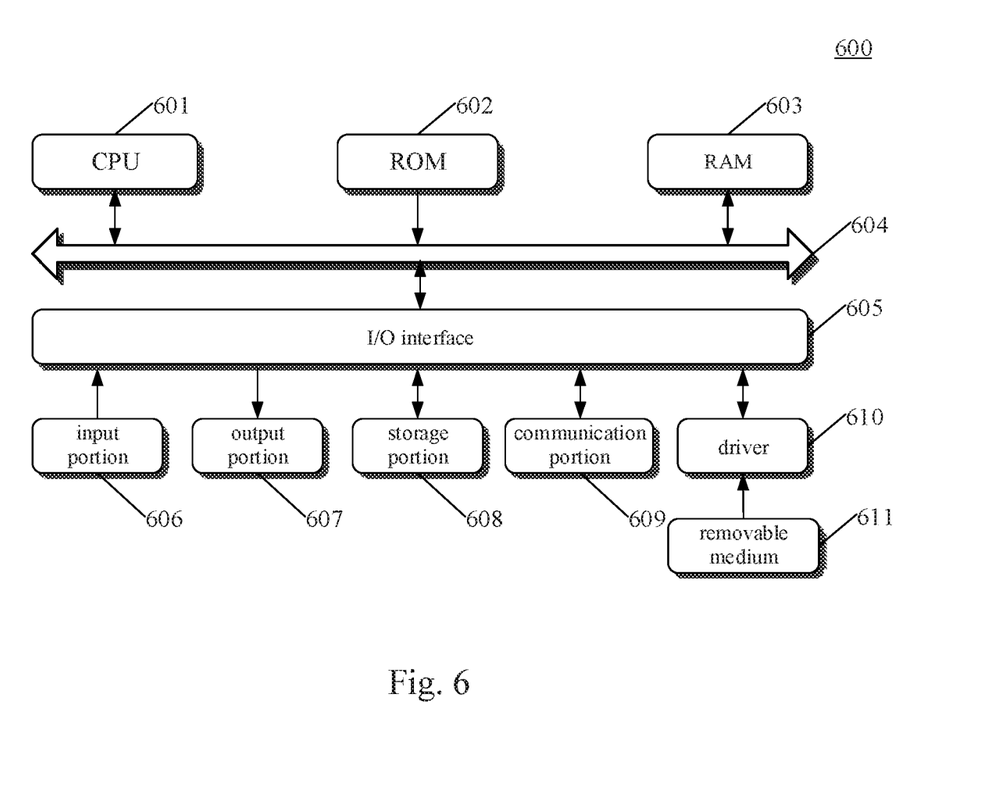
FIG. 6 is a schematic structural diagram of a computer system adapted to implement an electronic device according to the embodiments of the present disclosure.

Referring to FIG. 6, FIG. 6 illustrates a schematic structural diagram of a computer system 600 adapted to implement an electronic device of the embodiments of the present disclosure. The electronic device shown in FIG. 6 is merely an example and should not impose any restriction on the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 further stores various programs and data required by operations of the system 600. The CPU 601, the ROM 602 and the RAM 603 are connected to each other via a bus 604. An input/output (I/O) interface 605 is also connected to the bus 604.

The following components are connected to the I/O interface 605: an input portion 606 including a keyboard, a mouse. etc.; an output portion 607 including a cathode ray tube (CRT), a liquid crystal display device (LCD), a speaker, etc.; a storage portion 608 including a hard disk and the like; and a communication portion 609 including a network interface card, for example, a LAN card and a modem. The communication portion 609 performs communication processes via a network such as the Internet. A driver 610 is also connected to the I/O interface 605 as required. A removable medium 611, for example, a magnetic disk, an optical disk, a magneto-optical disk, and a semiconductor memory, may be installed on the driver 610, to facilitate the installation of a computer program from the removable medium 611 on the storage portion 608 as needed.

In particular, according to the embodiments of the present disclosure, the process described above with reference to the flowchart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the method of the present disclosure. It should be noted that the computer readable medium in the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs, which may be used by a command execution system, apparatus or element or incorporated thereto. In the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, a command execution system, apparatus or element. The program codes contained on the computer readable medium may be transmitted with any suitable medium including, but not limited to, wireless, wired, optical cable, RF medium, or any suitable combination of the above.

A computer program code for executing the operations according to the present disclosure may be written in one or more programming languages or a combination thereof. The programming language includes an object-oriented programming language such as Java, Smalltalk and C++, and further includes a general procedural programming language such as "C" language or a similar programming language. The program codes may be executed entirely on a user computer, executed partially on the user computer, executed as a standalone package, executed partially on the user computer and partially on a remote computer, or executed entirely on the remote computer or a server. When the remote computer is involved, the remote computer may be connected to the user computer through any type of network, including a local area network (LAN) or a wide area network (WAN), or be connected to an external computer (e.g., connected through Internet provided by an Internet service provider).

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be executed in a reverse sequence, depending on the function involved. It should also be noted that each block in the block diagrams and/or flowcharts as well as a combination of blocks may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor, for example, described as: a processor, comprising a generating unit, a recognizing unit, an option unit, and an outputting unit. The names of these units do not in some cases constitute a limitation to such units themselves. For example, the generating unit may also be described as "a unit for generating, in response to receiving voice inputted by a user, a voiceprint characteristic vector based on the voice."

In another aspect, the present disclosure further provides a computer readable medium. The computer readable medium may be the computer readable medium included in the apparatus described in the above embodiments, or a standalone computer readable medium not assembled into the apparatus. The computer readable medium stores one or more programs. The one or more programs, when executed by the apparatus, cause the apparatus to: generate, in response to receiving voice inputted by a user, a voiceprint characteristic vector based on the voice; input the voiceprint characteristic vector into a voiceprint recognition model to obtain identity information of the user, the voiceprint recognition model being used to represent a corresponding relationship between the voiceprint characteristic vector and the identity information of the user; select, from a preset multimedia file set, a predetermined number of multimedia files matching the obtained identity information of the user as target multimedia files; and generate, according to the target multimedia files, preview information and output the preview information.

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A method for outputting information by an electronic apparatus, the method comprising:
   in response to receiving voice inputted by a user, generating by a generating unit of the electronic apparatus a voiceprint characteristic vector based on the voice by extracting feature in the voice;
   inputting, by a recognition unit of the electronic apparatus, the voiceprint characteristic vector into a voiceprint recognition model to obtain identity information of the user, the voiceprint recognition model is a pre-trained model for representing a corresponding relationship between the voiceprint characteristic vector and the identity information of the user, wherein the identity information of the user includes a family member identifier, and the voiceprint recognition model comprises a classifier and a family member mapping table, the classifier for mapping the voiceprint characteristic vector to a certain category of given categories to retrieve a classification result for the user, wherein the family member mapping table recording a corresponding relationship between the family member identifier, a gender and an age, and the family member identifier being determined by retrieving the classification result of the classifier based on the matching of the family member identifier, the gender, and the age in the family member mapping table;

selecting, by an option unit of the electronic apparatus, from a preset multimedia file set, a predetermined number of multimedia files matching the obtained identity information of the user based on a descending order of retrieval numbers as target multimedia files;

generating and outputting, by the option unit of the electronic apparatus and according to the target multimedia files, preview information;

automatically selecting, by a timbre unit, from a preset timbre information set, timbre information matching the obtained identity information of the user based on a number of times of playback of a multimedia file; and outputting voice interaction information with a timbre indicated by the selected timbre information, to perform a voice interaction with the user.

2. The method according to claim 1, wherein the generating by the generating unit of the electronic apparatus comprises:

importing the voice into a pre-trained universal background model to perform mapping to obtain a voiceprint characteristic super-vector, the universal background model being used to represent a corresponding relationship between the voice and the voiceprint characteristic super-vector; and performing a dimension reduction on the voiceprint characteristic super-vector to obtain the voiceprint characteristic vector.

3. The method according to claim 1, further comprising:
performing, in response to determining the voice including an operation instruction, the operation instruction including at least one of: a channel selection, a volume control, an image parameter adjustment, a multimedia file retrieval, or a multimedia file playback.

4. The method according to claim 3, further comprising:
accumulating, for a multimedia file in at least one multimedia file involved by the operation instruction for the multimedia file retrieval, a number of retrievals for the multimedia file as a retrieval number corresponding to the multimedia file.

5. The method according to claim 3, further comprising:
accumulating, for a multimedia file in at least one multimedia file involved by the operation instruction for the multimedia file playback, a number of playbacks for the multimedia file as a playback number corresponding to the multimedia file, wherein the selecting, by the option unit of the electronic apparatus, from a preset multimedia file set, a predetermined number of multimedia files matching the obtained identity information of the user as target multimedia files includes:

selecting, from the preset multimedia file set, the predetermined number of multimedia files matching the obtained identity information of the user based on a descending order of the playback numbers as the target multimedia files.

6. The method according to claim 1, wherein the identity information of the user further includes one or more of: the gender, or the age.

7. The method according to claim 1, wherein the timbre indicated by the selected timbre information comprises: a timbre of an animation character, or a timbre of a star character.

8. An electronic apparatus for outputting information, comprising:
at least one processor; and
a memory storing instructions, wherein the instructions when executed by the at least one processor, cause the at least one processor to perform operations, the operations comprising:

generating, by a generating unit of the electronic apparatus, in response to receiving voice inputted by a user, a voiceprint characteristic vector based on the voice by extracting feature in the voice;

inputting, by a recognition unit of the electronic apparatus, the voiceprint characteristic vector into a voiceprint recognition model to obtain identity information of the user, the voiceprint recognition model is a pre-trained model for representing a corresponding relationship between the voiceprint characteristic vector and the identity information of the user, wherein the identity information of the user includes a family member identifier, and the voiceprint recognition model comprises a classifier and a family member mapping table, the classifier for mapping the voiceprint characteristic vector to a certain category of given categories to retrieve a classification result for the user, wherein the family member mapping table recording a corresponding relationship between the family member identifier, a gender and an age, and the family member identifier being determined by retrieving the classification result of the classifier based on matching of the family member identifier, the gender and the age in the family member mapping table;

selecting, by an option unit of the electronic apparatus, from a preset multimedia file set, a predetermined number of multimedia files matching the obtained identity information of the user based on a descending order of retrieval numbers as target multimedia files;

generating and outputting, by an option unit of the electronic apparatus and according to the target multimedia files, preview information;

automatically selecting, by a timbre unit, from a preset timbre information set, timbre information matching the obtained identity information of the user based on a number of times of playback of a multimedia file; and outputting voice interaction information with a timbre indicated by the selected timbre information, to perform a voice interaction with the user.

9. The electronic apparatus according to claim 8, wherein the generating by the generating unit of the electronic apparatus comprises:

importing the voice into a pre-trained universal background model to perform mapping to obtain a voiceprint characteristic super-vector, the universal background model being used to represent a corresponding relationship between the voice and the voiceprint characteristic super-vector; and performing a dimension reduction on the voiceprint characteristic super-vector to obtain the voiceprint characteristic vector.

10. The electronic apparatus according to claim 8, wherein the operations further comprise:
performing, in response to determining the voice including an operation instruction, the operation instruction including at least one of: a channel selection, a volume control, an image parameter adjustment, a multimedia file retrieval, or a multimedia file playback.

11. The electronic apparatus according to claim 10, wherein the operations further comprise:

accumulating, for a multimedia file in at least one multimedia file involved by the operation instruction for the multimedia file retrieval, a number of retrievals for the multimedia file as a retrieval number corresponding to the multimedia file.

12. The electronic apparatus according to claim 10, wherein the operations further comprise:
accumulating, for a multimedia file in at least one multimedia file involved by the operation instruction for the multimedia file playback, a number of playbacks for the multimedia file as a playback number corresponding to the multimedia file,
wherein the selecting, from the preset multimedia file set, the predetermined number of multimedia files matching the obtained identity information of the user as the target multimedia files includes:
selecting, by the option unit of the electronic apparatus, from the preset multimedia file set, the predetermined number of multimedia files matching the obtained identity information of the user based on a descending order of the playback numbers as the target multimedia files.

13. The electronic apparatus according to claim 8, wherein the identity information of the user further includes one or more of: the gender, or the age.

14. A non-transitory computer readable medium, storing a computer program, wherein the computer program, when executed by a processor, causes the processor to perform operations, the operations comprising:
in response to receiving voice inputted by a user, generating by a generating unit of an electronic apparatus, a voiceprint characteristic vector based on the voice by extracting feature in the voice;
inputting, by a recognition unit of the electronic apparatus, the voiceprint characteristic vector into a voiceprint recognition model to obtain identity information of the user, the voiceprint recognition model is a pre-trained model for representing a corresponding relationship between the voiceprint characteristic vector and the identity information of the user, wherein the identity information of the user includes a family member identifier, and the voiceprint recognition model comprises a classifier and a family member mapping table, the classifier for mapping the voiceprint characteristic vector to a certain category of given categories to retrieve a classification result for the user, wherein the family member mapping table recording a corresponding relationship between the family member identifier, a gender and an age, and the family member identifier being determined by retrieving the classification result based on matching of the family member identifier, the gender and the age of the classifier in the family member mapping table;
selecting, by an option unit of the electronic apparatus, from a preset multimedia file set, a predetermined number of multimedia files matching the obtained identity information of the user based on a descending order of retrieval numbers as target multimedia files;
generating and outputting, by an option unit of the electronic apparatus and according to the target multimedia files, preview information;
automatically selecting, by a timbre unit, from a preset timbre information set, timbre information matching the obtained identity information of the user based on a number of times of playback of a multimedia file; and
outputting voice interaction information with a timbre indicated by the selected timbre information, to perform a voice interaction with the user.

\* \* \* \* \*